US009745954B2

(12) United States Patent
Noronha et al.

(10) Patent No.: US 9,745,954 B2
(45) Date of Patent: Aug. 29, 2017

(54) ROTOR BLADE JOINT ASSEMBLY WITH MULTI-COMPONENT SHEAR WEB

(71) Applicant: General Electric Company, Schenectady, NY (US)

(72) Inventors: Lionel Anup Noronha, Bangalore (IN); Sujan Kumar Pal, Bangalore (IN); Ramananda Prabhu, Bangalore (IN)

(73) Assignee: General Electric Company, Schenectady, NY (US)

( * ) Notice: Subject to any disclaimer, the term of this patent is extended or adjusted under 35 U.S.C. 154(b) by 600 days.

(21) Appl. No.: 14/265,420

(22) Filed: Apr. 30, 2014

(65) Prior Publication Data
US 2015/0316026 A1    Nov. 5, 2015

(51) Int. Cl.
*F03D 1/06*    (2006.01)
*B23P 15/04*    (2006.01)
*B29C 65/00*    (2006.01)

(52) U.S. Cl.
CPC ............ *F03D 1/0675* (2013.01); *B23P 15/04* (2013.01); *B29C 66/1122* (2013.01); *B29C 66/1142* (2013.01); *F03D 1/0683* (2013.01); *Y02E 10/721* (2013.01); *Y02P 70/523* (2015.11); *Y10T 29/49339* (2015.01)

(58) Field of Classification Search
CPC F03D 1/0683; B29C 66/1122; B29C 66/1142
USPC ........................................ 416/233; 29/889.72
See application file for complete search history.

(56) References Cited

U.S. PATENT DOCUMENTS

| 2,503,450 A | * | 4/1950 | Nebesar .................... B64C 3/00 |
| | | | 220/DIG. 23 |
| 5,401,138 A | * | 3/1995 | Mosiewicz ........... F03D 1/0675 |
| | | | 29/889.21 |
| 5,476,704 A | | 12/1995 | Kohler |
| 6,513,757 B1 | | 2/2003 | Amaoka et al. |
| 6,520,706 B1 | | 2/2003 | McKague et al. |
| 6,800,956 B2 | | 10/2004 | Bartlett |
| 6,964,723 B2 | | 11/2005 | Lindsay et al. |
| 7,037,568 B1 | | 5/2006 | Rogers et al. |
| 7,093,359 B2 | * | 8/2006 | Morrison ................ F01D 5/282 |
| | | | 264/257 |
| 7,244,487 B2 | | 7/2007 | Brantley et al. |

(Continued)

FOREIGN PATENT DOCUMENTS

WO    WO 2009/155920 A1    12/2009

*Primary Examiner* — Kevin Murphy
(74) *Attorney, Agent, or Firm* — Dority & Manning, P.A.

(57) ABSTRACT

A wind turbine rotor blade joint assembly and method of manufacturing same is disclosed. The rotor blade includes an upper shell member having a spar cap configured on an internal face thereof and a lower shell member having a spar cap configured on an internal face thereof. A shear web extends between the spar caps along a longitudinal length of the blade. The shear web includes first and second longitudinally aligned components that extend from and are integral with respective spar caps. A joint assembly is configured between facing transverse ends of the first and second components of the shear web. The joint assembly includes a connecting structure configured to receive the transverse ends of the first and second components. The connecting structure is infused and integral with the first component of the shear web and bonded with the second component of the shear web.

17 Claims, 6 Drawing Sheets

(56) References Cited

U.S. PATENT DOCUMENTS

| | | |
|---|---|---|
| 7,258,828 B2 | 8/2007 | Fish |
| 7,371,304 B2 | 5/2008 | Christman et al. |
| 7,393,488 B2 | 7/2008 | Grose et al. |
| 7,625,623 B2 | 12/2009 | Grose et al. |
| 7,810,757 B2 | 10/2010 | Kirkwood et al. |
| 7,841,835 B2 | 11/2010 | Bagepalli et al. |
| 7,895,745 B2 | 3/2011 | Althoff et al. |
| 7,897,095 B2 | 3/2011 | Raeckers |
| 8,075,275 B2 | 12/2011 | Althoff et al. |
| 8,177,514 B2 * | 5/2012 | Hibbard ................ F03D 1/0675 416/226 |
| 8,257,048 B2 * | 9/2012 | Yarbrough .............. F03D 1/065 244/123.8 |
| 2003/0037867 A1 | 2/2003 | Bersuch et al. |
| 2005/0214122 A1 | 9/2005 | Sorensen et al. |
| 2006/0225278 A1 | 10/2006 | Lin et al. |
| 2007/0036659 A1 | 2/2007 | Hibbard |
| 2007/0110584 A1 | 5/2007 | Stommel |
| 2008/0219851 A1 | 9/2008 | Althoff et al. |
| 2010/0135815 A1 | 6/2010 | Bagepalli et al. |
| 2010/0143143 A1 | 6/2010 | Judge |
| 2010/0162567 A1 | 7/2010 | Kirkwood et al. |
| 2011/0008175 A1 | 1/2011 | Gau |
| 2011/0036495 A1 * | 2/2011 | Cinquin ............ B29C 66/73754 156/307.1 |
| 2011/0142663 A1 | 6/2011 | Gill |
| 2011/0176928 A1 | 7/2011 | Jensen |
| 2011/0229333 A1 * | 9/2011 | Flach ...................... B64C 3/185 416/223 R |
| 2012/0027610 A1 | 2/2012 | Yarbrough |
| 2012/0027612 A1 | 2/2012 | Yarbrough |
| 2012/0027613 A1 | 2/2012 | Yarbrough |
| 2012/0027614 A1 | 2/2012 | Yarbrough |
| 2012/0027615 A1 | 2/2012 | Irizarry-Rosado et al. |

\* cited by examiner

ROTOR BLADE JOINT ASSEMBLY WITH MULTI-COMPONENT SHEAR WEB

FIELD OF THE INVENTION

The present invention relates generally to the field of wind turbines, and more particularly to the shear web configuration within the wind turbine blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades are the primary elements for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to the generator for producing electricity.

The rotor blades typically consist of a suction side shell and a pressure side shell that are bonded together at bond lines along the leading and trailing edges of the blade. An internal shear web extends between the pressure and suction side shell members and is bonded to spar caps affixed to the inner faces of the shell members. Relatively exact length dimensions are required for the shear web to span between the spar caps and achieve a bond between the spar caps and shear web having sufficient width and thickness dimensions. Achieving these dimensions, as well as an adequate bond, can be difficult and the juncture between the spar caps and shear web is a time-consuming and tedious process that often requires significant re-work.

With typical blade configurations, the shear web is a continuous member that spans between the spar caps, and a rigid flange is used to achieve a desired bond width for bond paste applied between the spar caps and transverse ends of the shear web. This configuration, however, places significant stresses at the juncture between the shear web and spar cap and often results in the use of excess bond paste to achieve a desired bond width at this critical juncture. The excess paste contributes unnecessary weight to the blade and can break off and result in blade "rattling" during operation of the wind turbine (a not uncommon complaint from wind turbine owners/operators). Also, air voids and unpredictable squeeze-out of the bond paste in the typical configurations can result in areas of decreased bond strength, which is particularly problematic in sections of the blade where repair is not possible from within the rotor blade.

Accordingly, the industry would benefit from an improved bond configuration between the shear web and spar caps that addresses one or more of the deficiencies of certain conventional configurations.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade includes an upper shell member having a spar cap configured on an internal face thereof and a lower shell member having a spar cap configured on an internal face thereof. A shear web extends between the spar caps along a longitudinal length of the blade. The shear web includes first and second longitudinally aligned components that extend from and are integral with respective spar caps. A joint assembly is configured between facing transverse ends of the first and second components of the shear web. The joint assembly includes a connecting structure configured to receive the transverse ends of the first and second components. The connecting structure is infused and integral with the first component of the shear web. Further, the connecting structure is bonded with the second component of the shear web.

In another embodiment, the connecting structure includes one or more connecting members aligned end to end along a span of the rotor blade. In additional embodiments, each of the connecting members includes an H-shaped cross-section. In still further embodiments, the connecting structure may include a flexible material. Further, the H-shaped cross-section may include a first section and a second section. In various embodiments, the first sections of the connecting members are configured to receive the first component of the shear web and the second sections of the connecting members are configured to receive the second component of the shear web. In still further embodiments, the second sections of the connecting members include one or more flared ends configured to guide the second component of the shear web within the second sections of the connecting members.

In certain embodiments, the joint assembly further includes an adhesive configured within the second sections of each connecting member so as to bond the second component of the shear web within the second sections. For example, in various embodiments, the adhesive includes one of or a combination of the following: a bond paste, a binder, a tape, a gum, a wax, a plaster, a grout, a resin, an epoxy, a sealant, a glue, or similar. The flared ends described above may also assist in retaining an adhesive within the connecting structure. In alternative embodiments, the joint assembly may include one or more fasteners configured to secure the connecting structure to the second component of the shear web.

In additional embodiments, the first and second components of the shear web may include longitudinal side walls that surround a filler material. More specifically, the longitudinal side walls may extend substantially perpendicular from the respective spar caps and may be bonded or infused to the respective spar caps at a juncture between the first or second component and the respective spar caps. As such, the longitudinal side walls and the filler material of the first and second components may be infused directly with respective the spar caps during manufacturing such that additional bonding is not required.

In another aspect, the present subject matter is directed to a method for manufacturing a joint assembly for a wind turbine rotor blade. The method includes infusing a first component of a shear web with a first spar cap of a lower shell member of the rotor blade. A new step includes infusing a second component of the shear web onto an opposing spar cap of an upper shell member of the rotor blade. The method may also include a step of forming a connecting structure configured to join the first and second components of the shear web. The connecting structure includes one or more connecting members each having a first section and second section. A further step of the method includes infusing the first component of the shear web within the first sections of the connecting members. The method then includes inserting the second component of the shear web within the second sections of the connecting members so as to join the lower and upper shell members. It should be understood that the connecting structure and its connecting members may also include any of the features described herein.

In one embodiment, the method may also include a step of applying an adhesive within the second sections of the connecting members so as to further secure the second component of the shear web within the second sections of the connecting members. More specifically, in various embodiments, the adhesive may include one of or a combination of the following: a bond paste, a binder, a tape, a gum, a wax, a plaster, a grout, a resin, an epoxy, a sealant, a glue, or similar. In alternative embodiments, the method may include securing the connecting structure to the second component of the shear web via one or more fasteners.

In further embodiments, the method may include aligning the connecting members end to end along a span of the rotor blade. In yet another embodiment, the step of infusing the first and second components of the shear web with the first and second spar caps of the lower and upper shell members may further include: infusing longitudinal side walls to the respective spar caps, the longitudinal side walls extending substantially perpendicular from the respective spar caps; and, inserting a filler material within the longitudinal side walls for the first and second components such that the first and second components of the shear web are infused directly with the respective spar caps.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Figure 1:
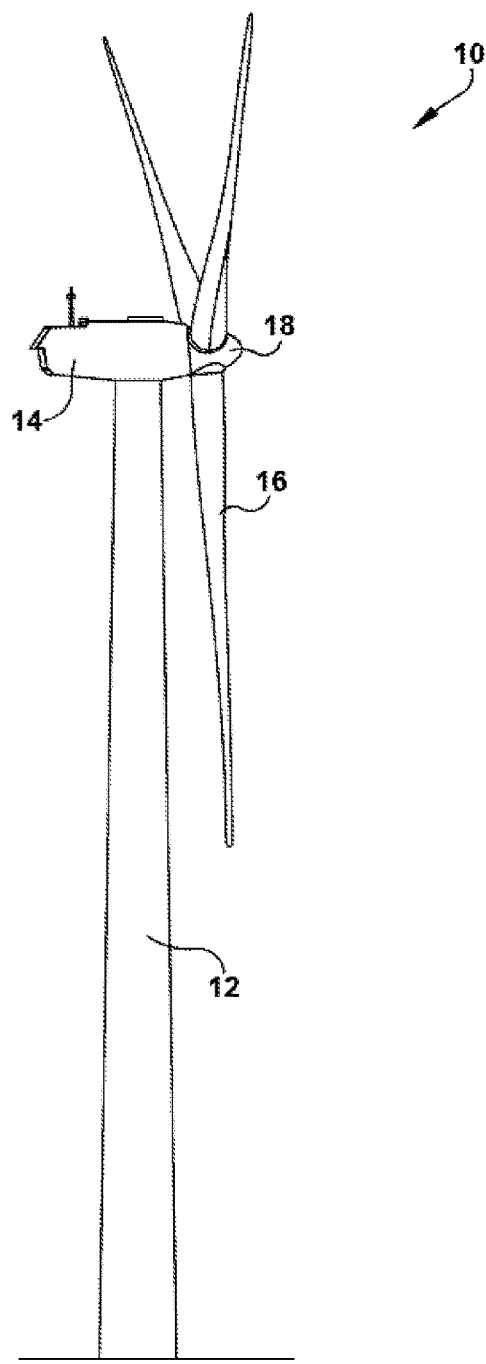
FIG. 1 illustrates a perspective view of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Generally, the present subject matter is directed to a wind turbine rotor blade having a multi-component shear web configuration joined by a joint assembly with a single bonded joint. More specifically, the wind turbine rotor blade includes first and second shell members each having a spar cap configured on an internal face thereof. A shear web extends between the spar caps along a longitudinal length or span of the rotor blade and includes first and second components extending from and integral with respective spar caps. The joint assembly is configured between facing transverse ends of the first and second components of the shear web and includes a connecting structure configured to receive the transverse ends of the first and second components. Further, the connecting structure is infused with the first component of the shear web and bonded with the second component of the shear web.

The present subject matter provides numerous advantages not present in the prior art. For example, the present disclosure reduces and/or eliminates the number of bonded joints, i.e. between the shear web and the spar caps, in the joint assembly by infusing the shear web components directly with the spar caps. In addition, the connecting structure, which in various embodiments has an H-shaped cross-section, may be integral with the first component of the shear web. Thus, the joint assembly, in certain embodiments, may require only one bonded joint between the connecting structure and the second component of the shear web. The connecting structure also provides further reinforcement to the joint assembly. In addition, the connecting structure controls and/or restricts the adhesive used to bond the connecting structure and the second component of the shear web. In still further embodiments, the connecting structure may be constructed of a flexible material such that it can move or bend with the rotor blade as needed.

Referring now to the drawings, FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
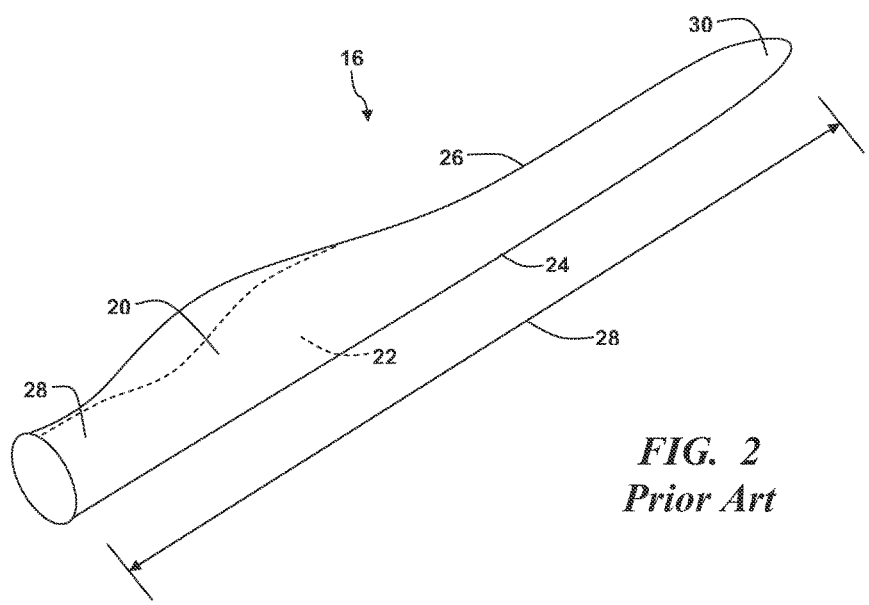
FIG. 2 illustrates a perspective view of a conventional wind turbine blade.

Referring now to FIG. 2, a more detailed view of one of the rotor blades 16 of FIG. 1 is illustrated. As shown, the rotor blade 16 includes an upper shell member 20 and a lower shell member 22. Further, the upper shell member 20 is configured as the suction side surface of the blade 16, while the lower shell member 22 is configured as the pressure side surface of the blade 16. The rotor blade 16 also includes a leading edge 24 and a trailing edge 26, as well as a root portion 28 and a tip portion 30. As is well known in the art, the upper shell member 20 and the lower shell member 22 may be joined together at the leading edge 24 and trailing edge 26. The rotor blade 16 also includes an internal cavity 25 (FIG. 3) in which various structural members, such as spar caps 32 and one or more shear webs 42 according to the present disclosure, may be configured.

Figure 3:
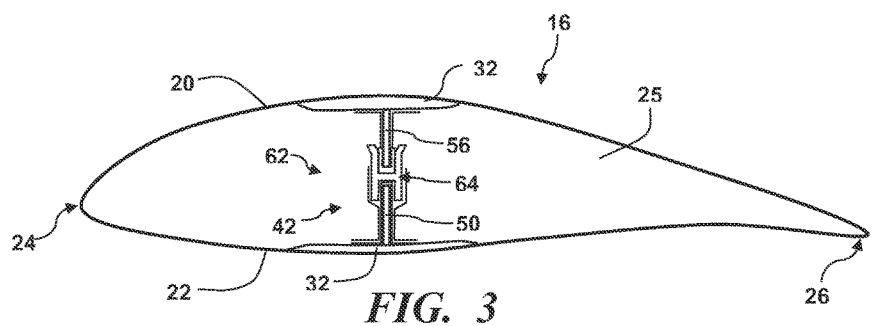
FIG. 3 illustrates a cross-sectional view of an exemplary wind turbine blade incorporating aspects of the invention.

Referring now to FIG. 3, a cross-sectional view of the rotor blade 16 of FIG. 2 is illustrated and incorporates various aspects of the invention. As shown, the rotor blade 16 includes a joint assembly 62 having at least one internal structural shear web 42 that spans between the upper 20 and lower shell members 22. In particular embodiments, the shear web 42 spans between structural spar caps 32 that are fixed to the internal faces of the shell members 20, 22. In accordance with aspects of the invention, the shear web 42 is a multi-component combination with a first component 50 affixed to the spar cap 32 on the lower shell member 22 and a second component 56 affixed to the spar cap 32 on the upper shell member 20.

Figure 4:
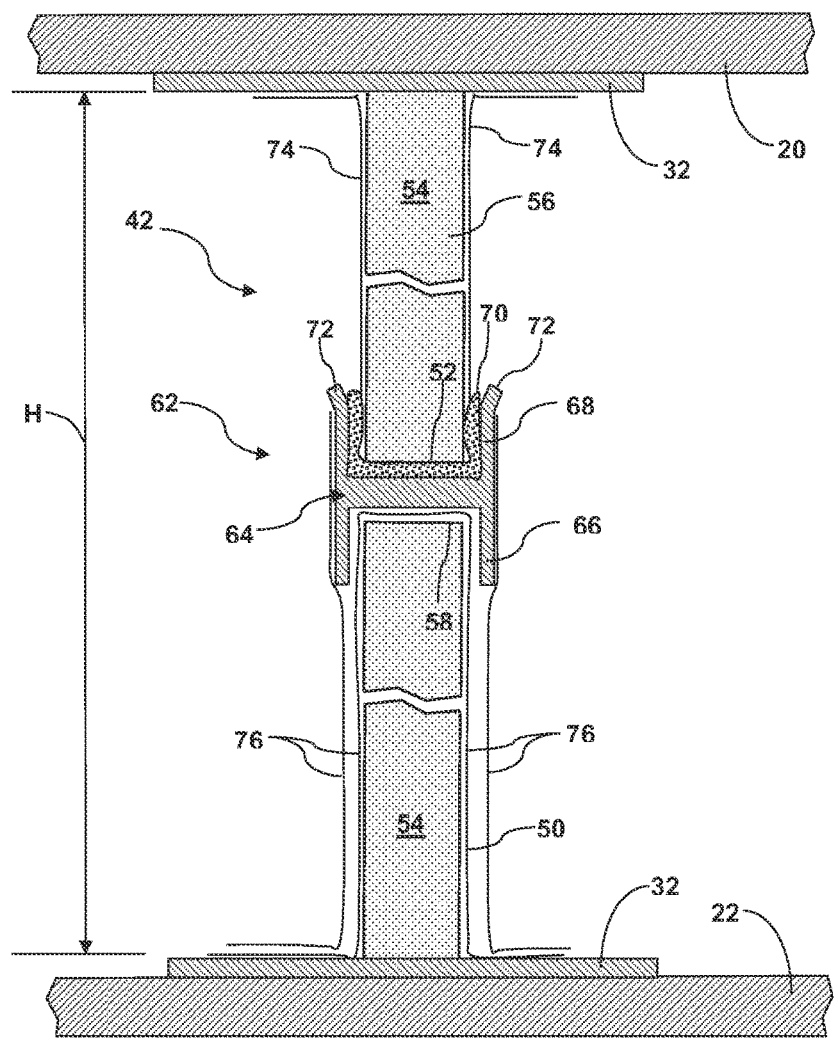
FIG. 4 illustrates an enlarged cross-sectional component view of a multi-component shear web joint assembly in accordance with an embodiment of the invention.

Referring now to FIG. 4, the shear web components 50, 56 may be formed similar to conventional shear webs with a filler material 54 between laminated side walls 74, 76 ("skin"), or as any other suitable structural member. For example, in various embodiments, the components 50, 56 may be affixed to respective spar caps 32 by any suitable bonding or attachment means, e.g. by directly molding or infusing the components 50, 56 with the spar caps 32, as depicted for example in FIG. 4. In this type of embodiment, the components 50, 56 may include longitudinal side walls 74, 76 that are infused directly to the respective spar caps 32 at a juncture between the first and second component 50, 56. Further, the longitudinal side walls 74, 76 may extend substantially perpendicular from the respective spar caps 32. In addition, the components 50, 56 may include a filler material 54 that is infused into longitudinal side walls 74, 76 such that they are integral with respective spar caps 32.

The filler material 54 may generally include any suitable material which is capable of being injected between the longitudinal side walls 74, 76. For example, in several embodiments, the filler material 54 may comprise a relatively lightweight, low-density foam material. More specifically, the filler material 54 may include a foam material having a density ranging from about 0.5 pounds per cubic feet ($lbs/ft^3$) to about 3 $lbs/ft^3$, more preferably about 2 $lbs/ft^3$. In further embodiments, the filler material 54 may have a density of less than 0.5 $lbs/ft^3$ or a density greater than 3 $lbs/ft^3$, such as 20 $lbs/ft^3$, or any other suitable density. Suitable low-density foam materials may include, but are not limited to, polystyrene foams (e.g., expanded polystyrene foams), polyurethane foams (e.g. polyurethane closed-cell foam), other foam rubbers/resin-based foams and various other open cell and closed cell foams. Alternatively, the filler material 54 may include other suitable low-density materials, such as balsa wood, cork, and the like.

Referring generally to FIGS. 3 and 4, the joint assembly 62 also includes a connecting structure 64 configured between the aligned transverse ends 52, 58 of the shear web components 50, 56 at an intermediate point along the longitudinal aspect of the shear web 42. The connecting structure 64 may be variously configured as explained in greater detail below. For example, as shown, the connecting structure 64 may be configured to receive the transverse ends 52, 58 of the first and second components 50, 56. In addition, the connecting structure 64 may be integral with the first component 50 of the shear web 42 and may be bonded with the second component 56 of the shear web 42.

Figure 5:
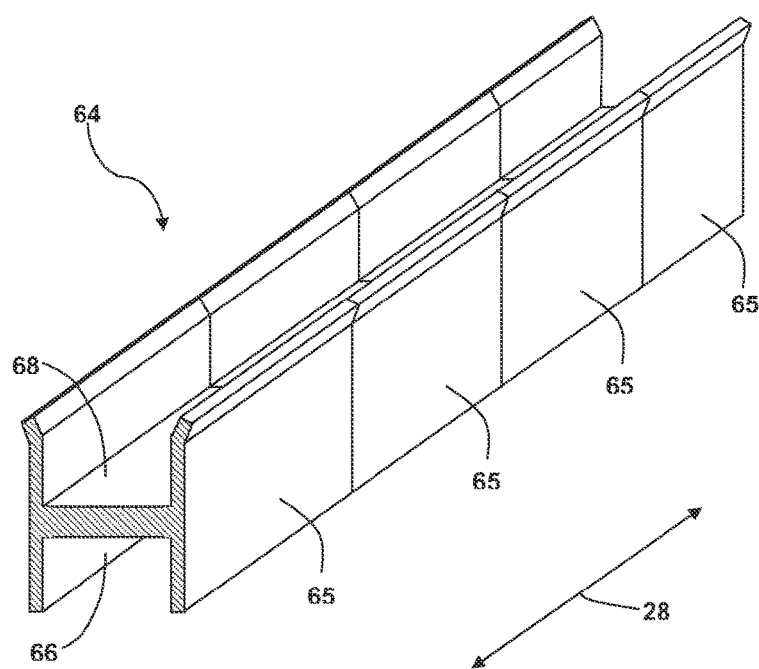
FIG. 5 illustrates one embodiment of a connecting structure according to the present disclosure.

In various embodiments, and referring particularly to FIG. 5, the connecting structure 64 may generally include one or more connecting members 65 generally aligned end to end along a span or span-wise direction 28 of the rotor blade 16. As such, the individual connecting members 65 may be easier to handle and install than a single connecting structure than extends the entire span 28 of the rotor blade 16. For example, as shown in the embodiment of FIG. 5, the connecting structure 64 includes four connecting members 65. It should be understood by those skilled in the art that any number of connecting members 65 may be utilized in the connecting structure 64, including more than four or less than four.

In addition, it should be understood that the connecting structure 64 may be located at any location along the longitudinal aspect or height H of the shear web 42. For example, as illustrated in the embodiment of FIG. 4, the connecting structure 64 is located at a location corresponding to approximately 50% of the height of the shear web 42 from each respective spar cap 32. In still further embodiments, the connecting structure 64 may be located at about 25% of the height H from one spar cap and 75% of the height H from the opposing spar cap 32. In still further embodiments, the connecting structure 64 may be located at any percent (%) height H of the shear web 42.

In additional embodiments, the connecting members 65 may include any suitable cross-sectional shape. For example, as shown in FIGS. 3-5, each of the connecting members 65 has an H-shaped cross-section. In still further embodiments, the connecting members 65 may have an I-shaped cross-section or any other shape having the capability of functioning as described herein. More specifically, as shown in FIGS. 4 and 5, the H-shaped cross-section generally includes a first section 66 or compartment and a second section 68 or compartment configured to receive the transverse ends 52, 58 of the shear web components 50, 56, respectively. In addition to receiving the transverse ends 52, 58 of the shear web components 50, 56, the first and second sections 66, 68 may also be configured to receive a portion of the shear web components 50, 56, e.g. a portion of the filler material 54 and the longitudinal side walls 74, 76.

Referring particularly to FIG. 4, the joint assembly 62 may also include an adhesive 70 configured within the second sections 68 of each connecting member 65 so as to bond the second component 56 of the shear web 42 within the second sections 68. It should be understood that the adhesive 70 may include any suitable adhesive now known or later developed in the art, including, but not limited to any one of or a combination of the following: a bond paste, a binder, a tape, a gum, a wax, a plaster, a grout, a resin, an epoxy, a sealant, a glue, or similar. In alternative embodiments, the joint assembly 62 may include one or more fasteners configured to secure the second component 56 of the shear web 42 within the connecting structure 64. For example, rather than using adhesive 70, the second component 56 may be secured within the second section 68 of the connecting member 65 via a mechanical fastener, a bolt, a screw, a pin, a dowel, or similar.

Referring particularly in FIGS. 4 and 5, in certain embodiments, the second sections 68 of the connecting members 65 may also include one or more flared ends 72. The flared ends 72 may be configured to guide the second component 56 of the shear web 42 within the connecting structure 64. In addition, the flared ends 72 may assist in retaining a quantity of adhesive 70 within the second section 68 of the connecting structure 64.

In addition, it should be understood that the connecting structure 64 may be constructed of any suitable material. For example, in one embodiment, the connecting structure 64 may be constructed of a flexible material. As used herein, the term "flexible" is meant to encompass its general broad meaning and the ability of the material to bend or flex with the rotor blade 16 easily without breaking. For example, in various embodiments, the flexible material may include any suitable elastomeric material. Suitable elastomeric materials may include woven or nonwoven elastomeric materials, elastomeric films, elastomeric laminates and combinations thereof. The flexible material may also include other woven or nonwoven materials, or stretchable but inelastic materials. As used herein and in the claims, the terms "elastic" and "elastomeric" have their usual broad meanings. For example, for purposes of this invention "elastic" and "elastomeric" may be conveniently defined as any material, such as natural or synthetic rubber, that is able to resume its original shape when a deforming force is removed. It should also be understood that the terms "elastic" and "elastomeric" are not limited by the definition and can have any suitable definition commonly known in the art.

Figure 6:
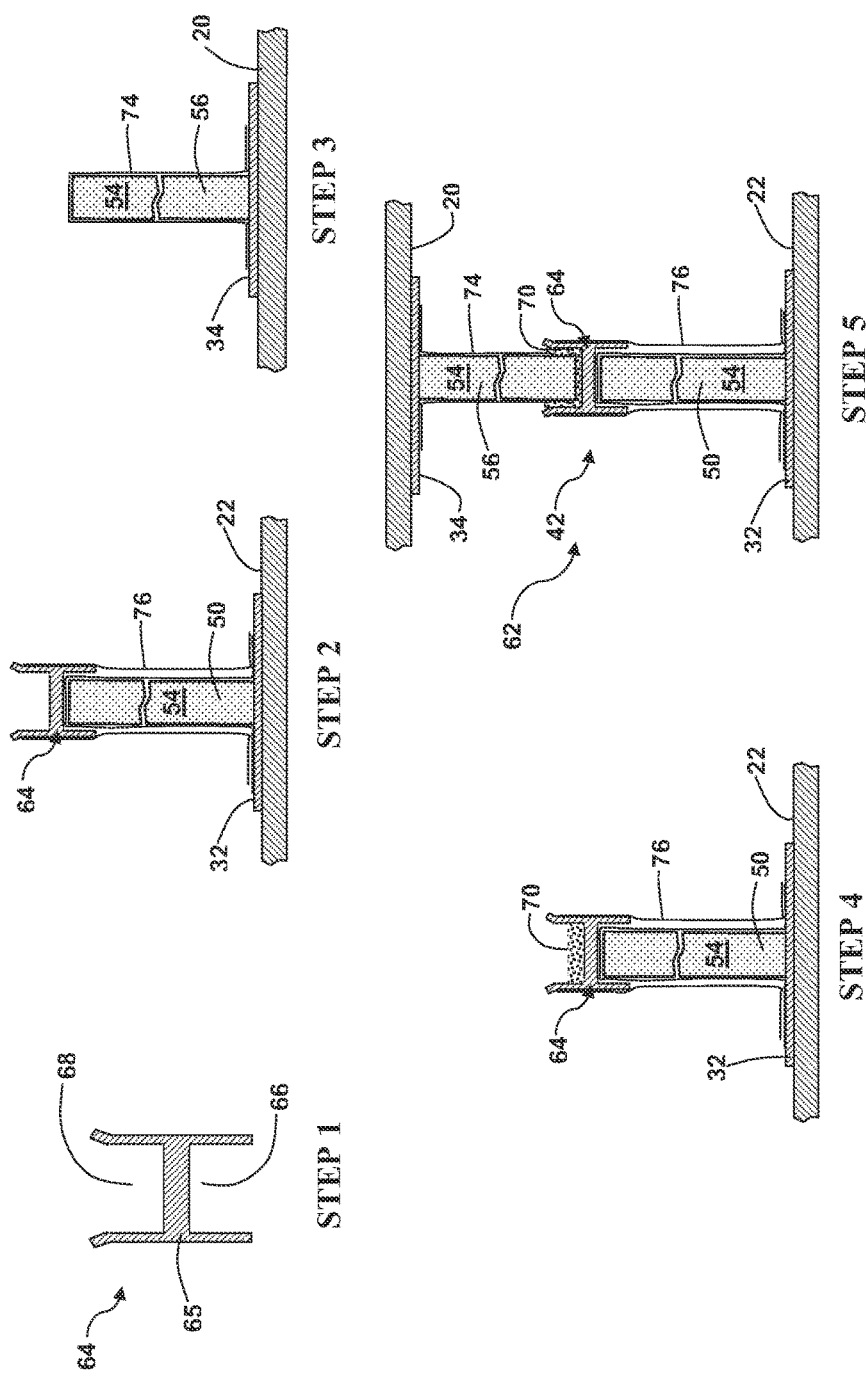
FIG. 6 illustrates a schematic diagram of one embodiment of the manufacturing process steps according to the present disclosure; and, FIG. 7 illustrates one embodiment of a method of manufacturing a multi-component shear web joint assembly in accordance with an embodiment of the invention.

Referring now to FIG. 6, a schematic diagram of one embodiment of the manufacturing process steps according to the present disclosure is illustrated. As shown in STEP 1, a connecting structure 64 having any combination of the features described herein is formed using any suitable manufacturing technique. For example, in one embodiment, the connecting structure 64 is formed by infusion molding. In addition, as mentioned, the connecting structure 64 may have one or more connecting members 65 having first and second sections 66, 68. At STEP 2, the first component 50 of the shear web 42 is infused with a first spar cap 32 of the lower shell member 22 of the rotor blade 16. For example, in one embodiment, the first component 50 is formed by infusing the longitudinal side wall 76 directly to the first spar cap 32. The filler material 54 may then be injected into the longitudinal side wall 76 such that the first component 50 of the shear web 42 is integral with the first spar cap 32. The pre-fabricated connecting structure 64 is then infused with the first component 50 of the shear web. At STEP 3, the second component 56 of the shear web 42 is infused with a second, opposing spar cap 34 of the upper shell member 20 of the rotor blade 16. For example, in one embodiment, the second component 56 is formed by infusing the longitudinal side wall 74 directly to the second spar cap 34. The filler material 54 may then be injected into the longitudinal side wall 74 such that the second component 56 of the shear web 42 is integral with the second spar cap 34. At STEP 4, adhesive 70 is applied within the second section 68 of the connecting member 65 so as to provide a means for securing the second component 56 of the shear web 42 within the second section 68 of the connecting member 64. Thus, at STEP 5, the first and second components 50, 56 may be joined by inserting the second component 56 formed in STEP 3 into the second section 68 of the connecting member 64.

Figure 7:
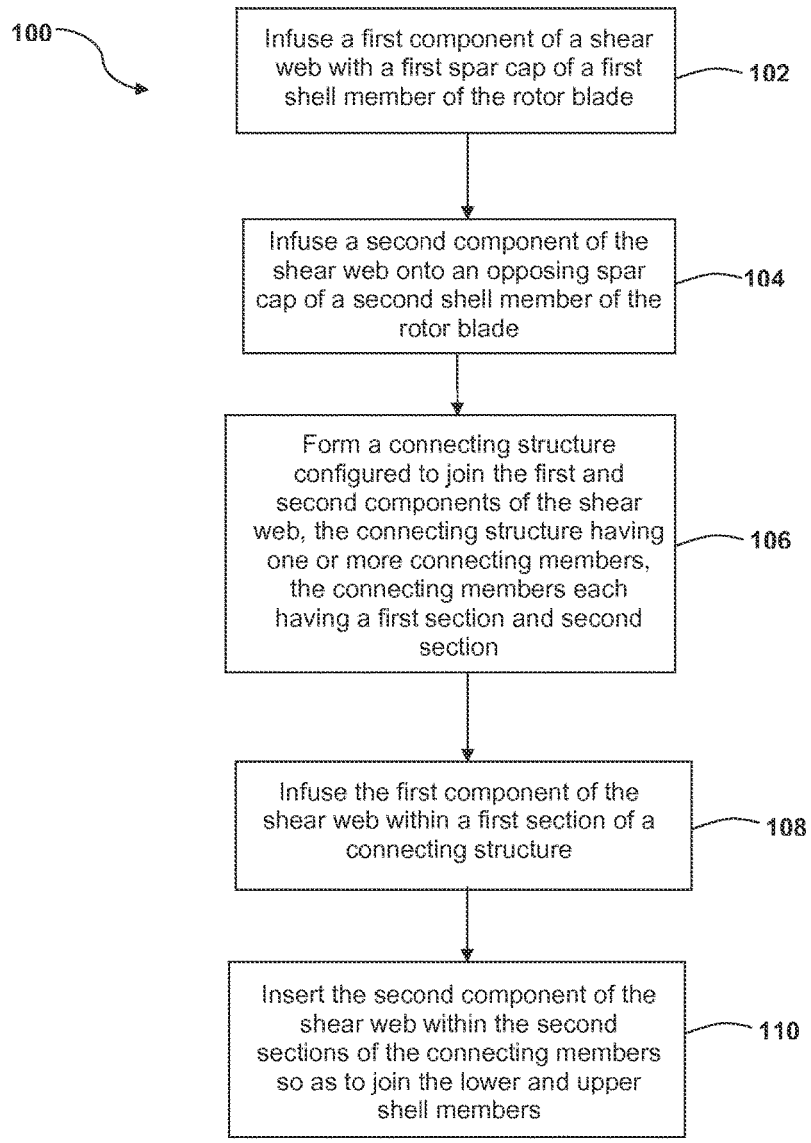

Referring now to FIG. 7, a flow diagram of a method 100 for manufacturing a joint assembly for a wind turbine rotor blade is illustrated. As shown, the method 100 includes a step 102 of infusing a first component of a shear web with a first spar cap of a lower shell member of the rotor blade. Another step 104 includes infusing a second component of the shear web onto an opposing spar cap of an upper shell member of the rotor blade. The method 100 also includes a step 106 of forming a connecting structure configured to join the first and second components of the shear web, the connecting structure having one or more connecting members, the connecting members each having a first section and second section. A next step 108 includes infusing the first component of the shear web within the first sections of the connecting members. A further step 110 includes inserting the second component of the shear web within the second sections of the connecting members so as to join the lower and upper shell members.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine rotor blade, comprising:
an upper shell member having a spar cap configured on an internal face thereof;
a lower shell member having a spar cap configured on an internal face thereof;
a shear web extending between said spar caps along a longitudinal length of said blade, said shear web further comprising first and second components extending from and integral with respective said spar caps; and,
a joint assembly configured between facing transverse ends of said first and second components of said shear web, said joint assembly further comprising:
a connecting structure comprising a plurality of connecting members, each connecting member comprising an H-shaped cross-section defined by generally parallel side walls connected together by a chord-wise extending structural wall, the parallel side walls and the chord-wise extending structural wall of each connecting member having a first compartment and second compartment, the first and second compartments of the connecting members configured to receive said transverse end of said first and second components, respectively, wherein said connecting structure is infused and integral with said first component of said shear web, and wherein said connecting structure is bonded with said second component of said shear web.

2. The wind turbine rotor blade of claim 1, wherein said plurality of connecting members are aligned end to end in a span-wise direction of the rotor blade, each of the plurality of connecting members contacting adjacent connecting members.

3. The wind turbine rotor blade of claim 2, wherein said second compartments of said plurality of connecting members comprise one or more flared ends configured to guide said second component of said shear web within said second compartments of said plurality of connecting members.

4. The wind turbine rotor blade of claim 2, wherein said joint assembly further comprises an adhesive configured within said second compartments of each of the plurality of connecting members so as to bond said second component of said shear web within said second compartments.

5. The wind turbine rotor blade of claim 4, wherein said adhesive comprises one of or a combination of the following: a bond paste, a binder, a tape, a gum, a wax, a plaster, a grout, a resin, an epoxy, a sealant, or a glue.

6. The wind turbine rotor blade of claim 1, wherein said connecting structure comprises a flexible material.

7. The wind turbine rotor blade of claim 1, wherein said joint assembly further comprises one or more fasteners configured to bond said connecting structure to said second component of said shear web.

8. The wind turbine rotor blade of claim 1, said first and second components of said shear web comprise longitudinal side walls that surround a filler material, the longitudinal side walls extending substantially perpendicular from said respective spar caps and being bonded to said respective spar caps at a juncture between said first or second component and said respective spar caps.

9. The wind turbine rotor blade of claim 8, wherein said longitudinal side walls and said filler material of said first and second components are infused directly with respective said spar caps.

10. A method for manufacturing a joint assembly for a wind turbine rotor blade, said method comprising:
  infusing a first component of a shear web with a first spar cap of a lower shell member of the rotor blade;
  infusing a second component of the shear web onto an opposing spar cap of an upper shell member of the rotor blade;
  forming a connecting structure having an H-shaped cross-section configured to join the first and second components of the shear web, the connecting structure having a plurality of connecting members, the plurality of connecting members each having a first compartment and second compartment;
  infusing the first component of the shear web within the first compartments of the plurality of connecting members; and,
  inserting the second component of the shear web within the second compartments of the plurality of connecting members so as to join the lower and upper shell members.

11. The method of claim 10, further comprising applying an adhesive within the second compartments of the plurality of connecting members so as to secure the second component of the shear web within the second compartments of the plurality of connecting members.

12. The method of claim 11, wherein the adhesive comprises one of or a combination of the following: a bond paste, a binder, a tape, a gum, a wax, a plaster, a grout, a resin, an epoxy, a sealant, or a glue.

13. The method of claim 10, further comprising securing the connecting structure to the second component of the shear web via one or more fasteners.

14. The method of claim 10, further comprising aligning the plurality of connecting members end to end in a spanwise direction of the rotor blade.

15. The method of claim 10, wherein infusing the first and second components of the shear web with the first and second spar caps of the lower and upper shell members further comprises:
  infusing longitudinal side walls to the respective spar caps, the longitudinal side walls extending substantially perpendicular from the respective spar caps; and
  inserting a tiller material within the longitudinal side walls so as to form the first and second components such that the first and second components of the shear web are infused directly with the respective spar caps.

16. The method of claim 10, wherein each of the plurality of connecting members further comprises one or more flared ends configured to guide the second component of the shear web within the second compartments of the plurality of connecting members.

17. The method of claim 10, wherein the connecting structure comprises a flexible material.

\* \* \* \* \*